(12) United States Patent
Grothe et al.

(10) Patent No.: US 7,758,220 B1
(45) Date of Patent: Jul. 20, 2010

(54) IN-GROUND INSPECTION SYSTEM

(75) Inventors: William J. Grothe, Mission Viejo, CA (US); Paul E. Robbins, Mission Viejo, CA (US); James R. Zarian, Corona del Mar, CA (US)

(73) Assignee: Lumenyte International Corporation

( * ) Notice: Subject to any disclaimer, the term of this patent is extended or adjusted under 35 U.S.C. 154(b) by 144 days.

(21) Appl. No.: 11/905,635

(22) Filed: Oct. 3, 2007

(51) Int. Cl.
*F21V 21/14* (2006.01)
*F21V 21/00* (2006.01)
*F21S 4/00* (2006.01)

(52) U.S. Cl. .................... 362/486; 362/576; 362/138; 362/249.04

(58) Field of Classification Search .................. 362/555, 362/558, 559, 576, 582, 146, 153, 153.1, 362/249.02, 249.04, 138, 486
See application file for complete search history.

(56) References Cited

U.S. PATENT DOCUMENTS

| | | | |
|---|---|---|---|
| 6,431,717 B1 * | 8/2002 | Anderson et al. | 362/600 |
| 6,461,017 B2 * | 10/2002 | Selkee | 362/237 |
| 6,523,986 B1 * | 2/2003 | Hoffmann | 362/576 |
| 6,761,474 B1 * | 7/2004 | Race | 362/486 |
| 6,997,594 B2 | 2/2006 | Grothe | |
| 7,229,201 B2 * | 6/2007 | Krupa et al. | 362/574 |

* cited by examiner

*Primary Examiner*—Stephen F Husar
*Assistant Examiner*—James W Cranson

(57) ABSTRACT

An in-ground inspection lighting system, particularly an in-ground inspection lighting system for underside of vehicles including an elongated, embedded light transmitting optical fiber in a polymeric mass, remotely energized, and placed into a pre-determined channel formed in a medium such as concrete or asphalt, whereby the embedded embodiment does not protrude from the channel and is essentially flush mounted in the medium. Alternatively, an in-ground inspection lighting system including, an elongated embodiment of linear light emitting diode assemblies embedded in a polymer mass and placed into a pre-determined channel formed in a medium such as concrete or asphalt, whereby the embedded embodiment does not protrude from the channel and is essentially flush mounted in the medium. The linear embodiments to provide a steady, uniform flood of light up to the underside of a vehicle to be inspected.

3 Claims, 4 Drawing Sheets

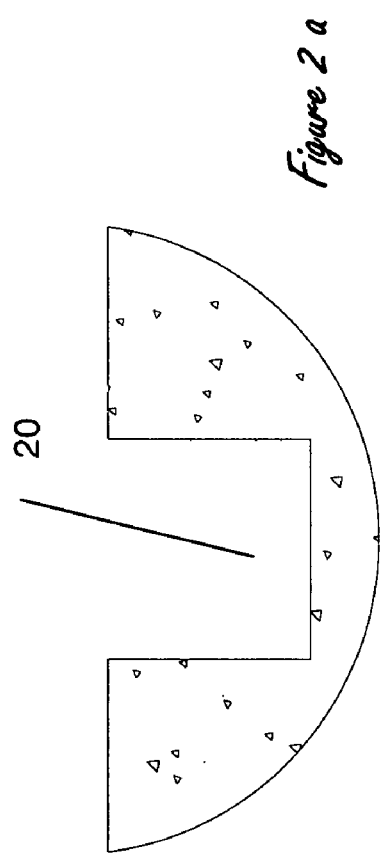
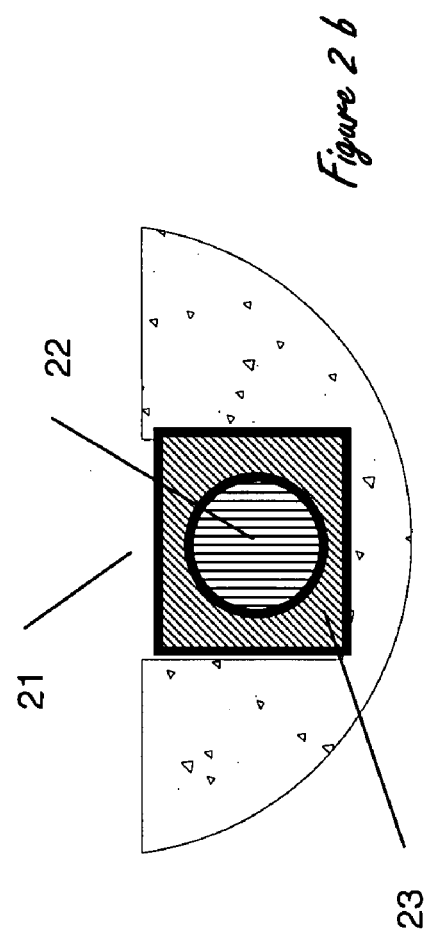
Figure 2

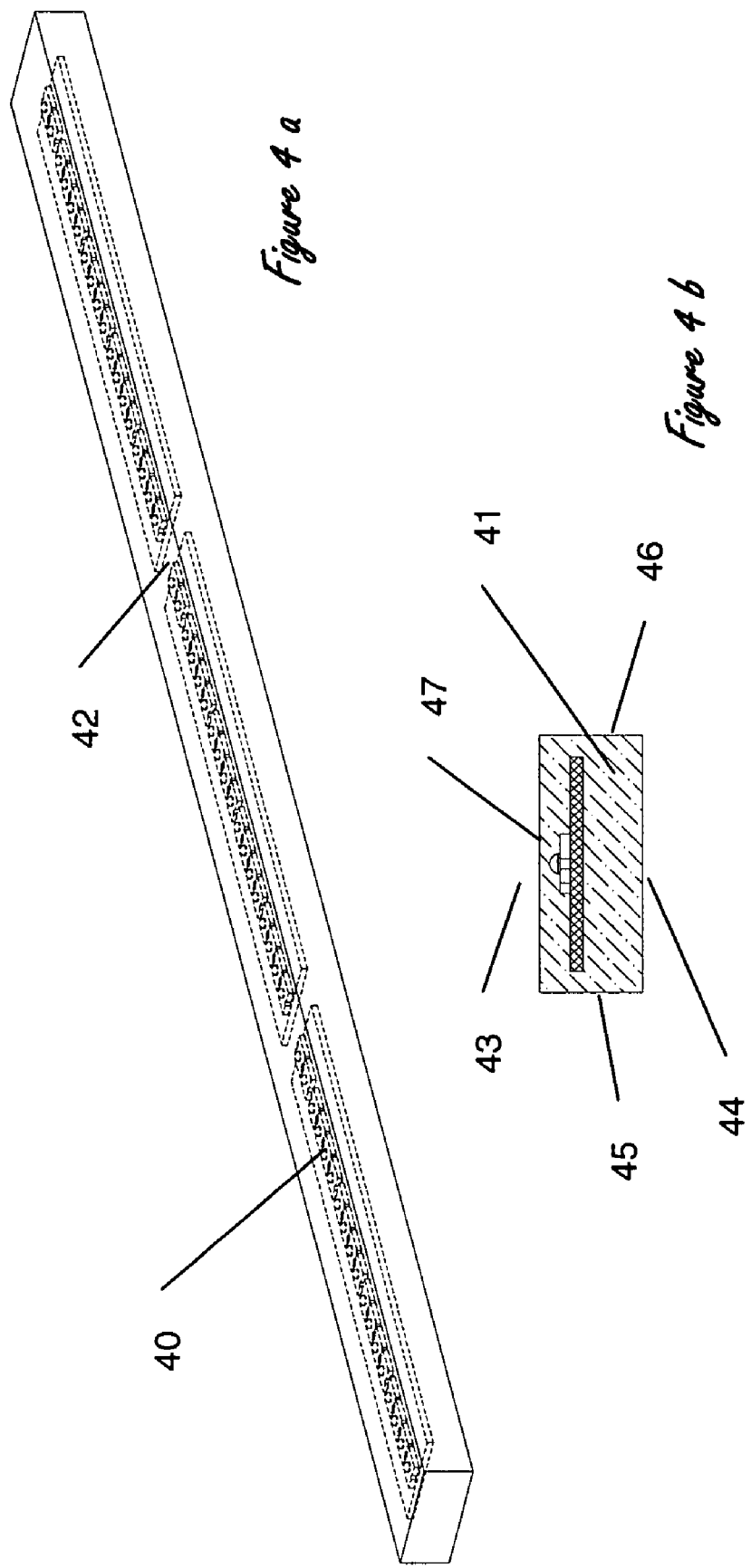

IN-GROUND INSPECTION SYSTEM

CROSS REFERENCE TO RELATED APPLICATIONS

This application claims the benefit of the earlier filing date of U.S. Provisional Applications Ser. No. 60/581,777, filed in the U.S. Patent and Trademark Office on filed Oct. 16, 2006, the entire contents, which are incorporated herein by reference.

TECHNICAL FIELD

The present invention is directed to inspection systems, more particularly to systems that are imbedded and may be used for lighting the underside of vehicles to facilitate inspection thereof.

BACKGROUND

In the security field, and more particularly with regard to inspection of undersides of vehicles, it has been customary to raise the vehicle up off the ground through use of a ramp, hydraulic lift or the like. In other instances, conventional flashlights have been used. Yet in other instances, inspectors kneel or crawl underneath the vehicle, to inspect the underside of the vehicles. In yet another instance, cameras are used to send real-time images of the underside of a vehicle to a closed-circuit television. The cameras need an external lighting system for this purpose.

U.S. Pat. No. 6,997,594 discloses a mobile under-vehicle inspection system for field applications. The inspection system includes a series of mats into which two lengths of flexible, polymeric side light transmitting optical fiber are extended. The two optical fibers extend along channels placed near the edges of the mats, and at a distance to be within the tracks of wheels of a vehicle to be inspected. The optical fibers include notches and a reflector directed to provide a steady, uniform flood of light up to the underside of a vehicle to be inspected. A light source remotely located from the series of mats provides the necessary light.

Although the above system has proved valuable in field applications; nonetheless, a more permanent form is desired that lasts longer, provides more light and is more conspicuous when turned off.

According to the present invention, there is disclosed lighting embodiments that offer advantages over or supplant the function the above systems.

In one embodiment, an elongated polymeric side-light, transmitting optical fiber is embedded into a polymeric mass to extend the life of the optical fiber. Further, the polymeric mass is configured in such a shape to easily fit into a pre-determined channel formed in location (i.e., a concrete channel or asphalt channel). The advantage offered is that the optical fiber does not protrude from the channel. Another advantage is that the installation is more permanent.

In yet another embodiment of the present invention, nodes including light sources such as light emitting diodes ("LEDs") are embedded into a polymeric mass. The nodes are electrically connected to each other to form a linear embodiment. One or more LEDs are installed within each node. The polymeric mass contains the nodes and the electrical connectors. Further, the polymeric mass is configured in such a shape to easily fit into a pre-determined channel formed in location (i.e., a concrete channel or asphalt channel). The advantage offered is that the embodiment does not protrude from the channel while providing light for inspection of the underside of vehicles. The use of LEDs offers many advantages. The advantages include: elimination of lamp breakage and/or filament breakage in demanding field application, relatively longer life, resulting in lowering maintenance costs, resistant to vibration, impact, sudden movements and shock resulting in an ideal system for demanding field applications, low voltage application resulting in elimination of a chance of electrocution, low energy use allowing battery operation and instant on/off.

DISCLOSURE OF INVENTION

In accordance with the principles of the present invention two types of in-ground, linear inspection systems are provided.

In the first type, a length of fiber optic conduit ("FOC") is embedded in a polymer mass and energized by a light source such as, a high intensity discharge lamp, LED or halogen lamp, and adapted for inspection of the underside of vehicles. In practice, a length of such FOC is embedded into a polymer mass forming a predetermined cross-section, to be fitted into a channel. The channel is configured to engulf the polymer mass containing the FOC and create a flush-mounted inspection system. By being flush mounted, the embodiment of the present invention is protected from the outside elements such as the weight of vehicles. When embodiment is energized, light is transmitted along the length of the FOC, and is radiated upward to provide a steady source of light to facilitate inspection.

In yet another preferred embodiment of the present invention, a series of LED(s) are arranged in a linear manner on a circuit board to form LED assemblies. The linear LED assemblies are embedded in a polymer mass forming a predetermined cross-section, to easily be fitted into a channel. The channel is configured to engulf the polymer mass containing the LED assemblies and create a flush-mounted inspection system. When LED assemblies are energized, light is radiated upward, preferably through lenses, to provide a steady source of light, at a predetermined angle, to facilitate inspection. The preferred lenses are generally provided to adjust the beam angle for better inspection.

To render the systems highly durable for use in a wide variety of conditions of use; the systems' polymers are selected to be highly transparent and to provide resistance to adverse environmental factors such as yellowing upon exposure to sun light, moisture and abrasion among other features.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIG. 1a represents a portion of the FOC/polymer embodiment of FIG. 1 between lines A-A and B-B. The polymer has been removed in one portion in FIG. 2a to reveal the FOC.

FIG. 2a is a cross sectional, schematic view of a channel formed in a medium (e.g., concrete, asphalt, etc.) to accept the FOC/polymer embodiment of the present invention shown in a cross sectional, schematic view in FIG. 2b.

FIG. 4a is similar to FIG. 1a above, except that the FOC has been replaced with LED assemblies to form an embodiment of the present invention.

FIG. 4b is a cross sectional, schematic view of the embedded LED assemblies of FIG. 4a according to the present invention.

DETAILED DESCRIPTION OF THE PREFERRED EMBODIMENTS

Figure 1:
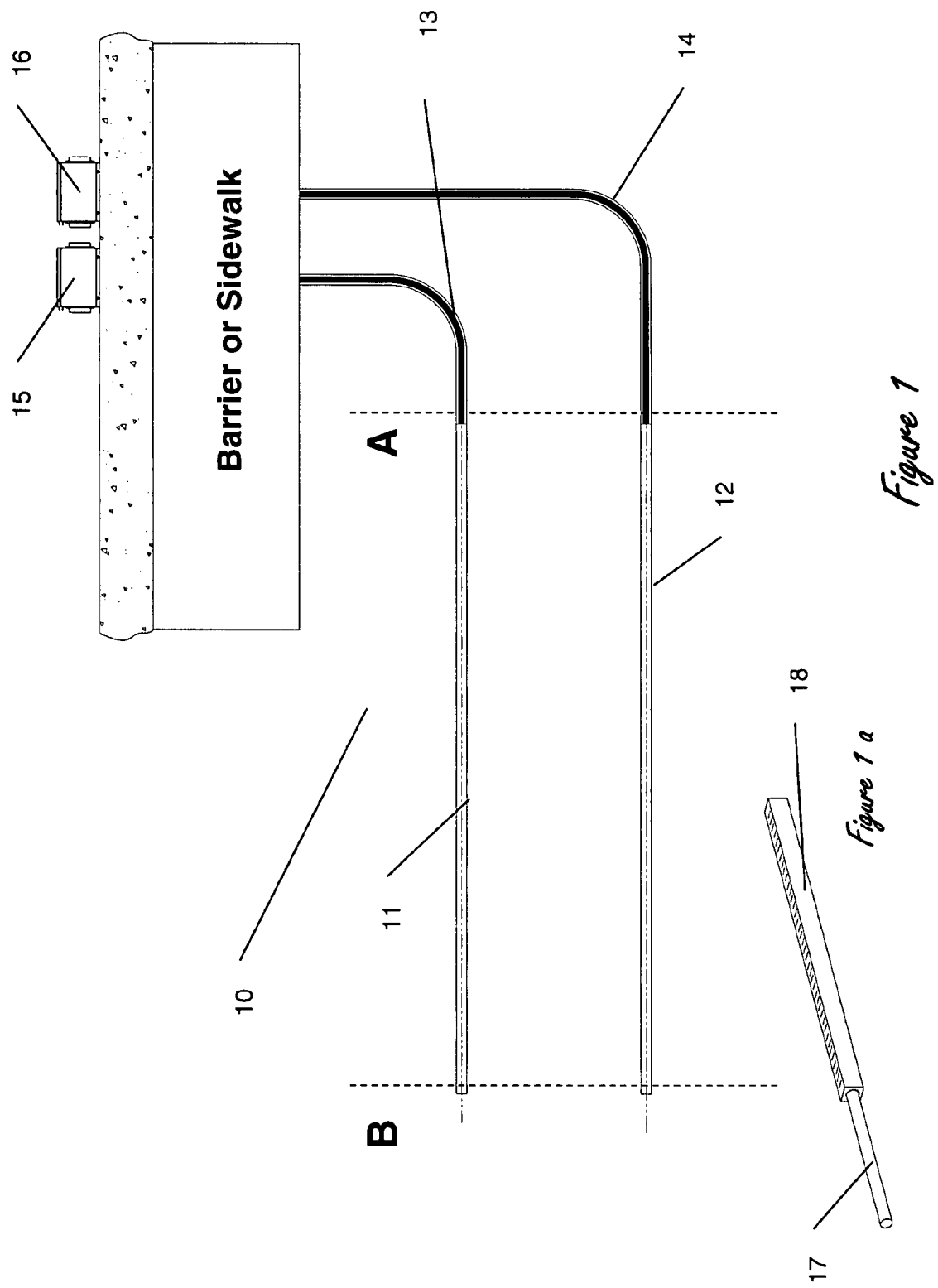
FIG. 1 is a top, schematic view of a preferred FOC/polymer embodiment of the present invention.

Referring to FIG. 1, a preferred embodiment 10 of the under vehicle inspection system includes at least one and preferably two embedded FOC 11 and 12. The embedded FOC 11 and 12 may be covered along its length is some areas as shown by dark areas 13 and 14 and buried under ground. Normally, the FOC 11 and 12 are laid in a parallel configuration and at a certain distance from each other to illuminate the under vehicle evenly. The two FOC 11 and 12 are energized by two light sources 15 and 16. The light sources 15 and 16 are normally mounted remotely from the inspection area to protect the light sources, to facilitate lamp changing and to be easily maintained. The illuminating areas of the FOC 11 and 12 in FIG. 1 are located between the imaginary lines A-A and B-B included here for clarification only.

A section of the illuminating section of the FOC 11 or 12 is expanded and shown in FIG. 1a. In this section, the fiber optic 17 and embedding polymer 18 are shown. The fiber optic 17 may contain cuts and other modifications including reflectors as disclosed in the U.S. Pat. No. 6,289,150.

FIG. 2a of FIG. 2 represents a channel 20 that has been formed, for example, in a roadway or a check point to accept the illuminating portion of the FOC 21 of the present invention. The FOC 21 of the present invention includes fiber optic 22 imbedded in a polymer mass 23 and placed in channel 20 as shown in FIG. 2b of FIG. 2.

It is within the scope of this invention to use any form of linear optical conduit to transmit and disperse light. However, a preferred conduit is a FOC supplied by Lumenyte International Corporation of Foothill Ranch, Calif., U.S.A., under the trade name LEF™ (i.e., light emitting fiber). The embedding material can be of any transparent or translucent material and can be rigid or flexible; however, flexible polymers such as polyurethanes, silicones, acrylics and epoxies are preferred so long as the embedding material provides adequate transparency, durability, abrasion resistance among other desired properties. One preferred embedding material may be an aliphatic polyurethane supplied by BJB Enterprises, Inc. of Tustin, Calif., U.S.A. under part number WC-575 A/B SAM.

It is understood that any fiber optic with appropriate cross section can be embedded in the embedding material. The embedding material can also have any cross sectional shape that may be appropriate for the present application. For example, the fiber optic can have a round cross section and be embedded into a polymer with a square-shaped cross section.

Figure 3:
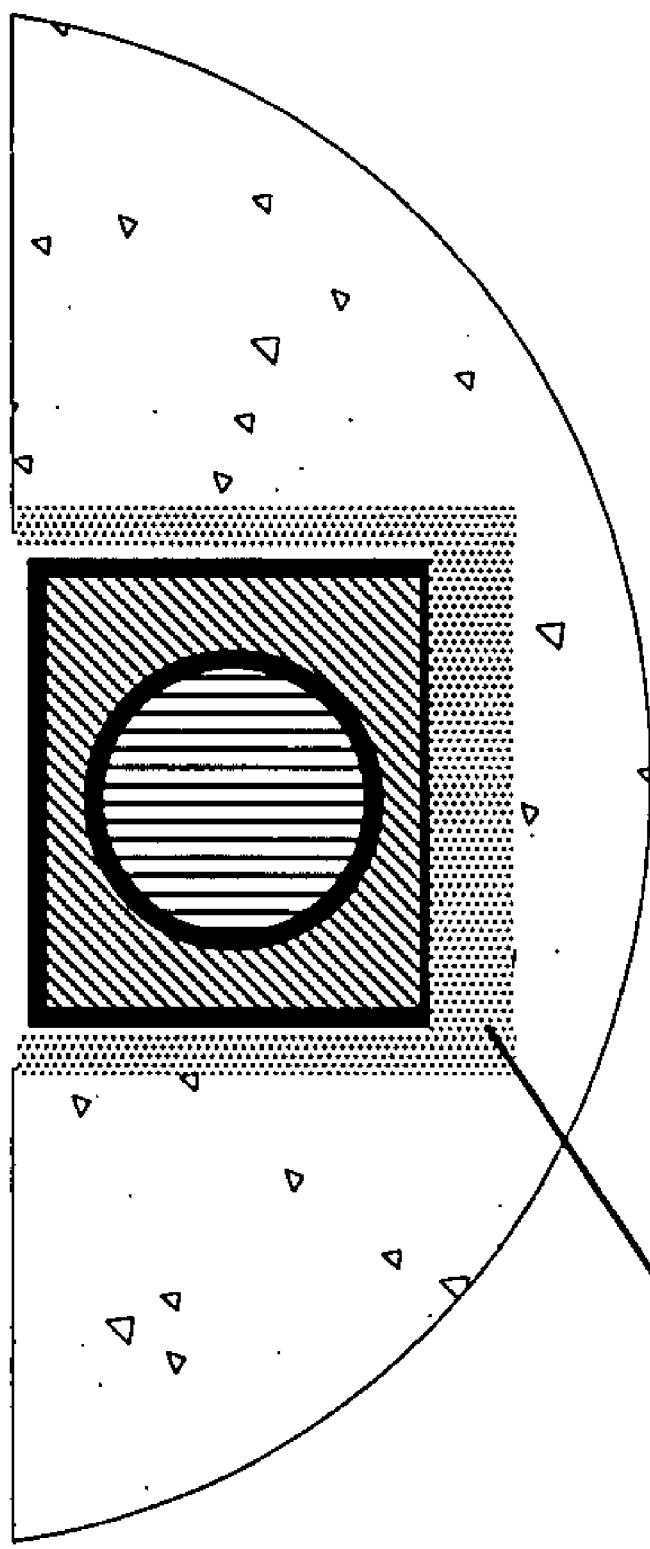
FIG. 3 is a cross sectional, schematic view of an arrangement similar to FIG. 2a, except that an insert has been further included in the channel to accept the FOC/polymer embodiment of the present invention.

It is also within the scope of this invention to insert a channel of a different material into the channel created in the holding medium, an insert. For example, an aluminum channel can be inserted in the channel, as an insert, and then the FOC placed in the aluminum channel as shown in FIG. 3. The reason to use an aluminum channel is to increase the durability of the channel or enhance the properties of the overall system. Now referring to FIG. 3, aluminum channel 30 is added to the channel 20 of FIG. 2 and FOC 21 placed inside the channel 30.

In yet another preferred embodiment of the under vehicle inspection lighting system of the present invention, linear arrangement of LED assemblies are embedded in a material mass such as a polymer. In essence, the fiber optic as shown in FIG. 1 is replaced by linear arrangement of LED assemblies to project light upward when activated. In practice, linear LED assemblies of, for example, 5 to 50 cm and preferably 15 to 30 cm long are connected by conducting wire, and spaced apart by 5 cm and preferably 2.5 cm. A series of linear assemblies are then embedded in a polymer mass as explained in the FOC assemblies before. The reason for the use of LED assemblies is to increase the life expectancy, to be more energy efficient, to have a more compact system, to eliminate remote light source(s) among other benefits. The reason for using linear assemblies separated by wire at certain intervals is to provide physical flexibility during shipping and installation.

It is understood that embedded LED assemblies are also placed in a channel as shown in FIG. 2 or in an aluminum channel insert inside another channel as shown in FIG. 3. Care is taken to assure that the embedded LED assemblies are flush with the road or pavement surface.

Now, referring to FIG. 4a of FIG. 4, linear LED assemblies 40 to project light onto the underside of a vehicle are shown embedded in polymer mass 41. For instance, linear LED assemblies 40 were made using white Superflux™ LEDs supplied by Lumileds of San Jose, Calif., U.S.A. It is within the scope of this invention to have the linear LED assemblies in any length; however, for ease of handling and storage, the length of each LED assembly was optimized at 15 to 30 cm. The separation of LED assemblies by wire at certain intervals to provide physical flexibility during shipping and installation is shown, for example, at interval 42 in FIG. 4a.

The viewing angle of LEDs dictate the light dispersion pattern. It is possible to use a mixture of LEDs with different viewing angles at predetermined arrangements, to focus some of the light into less accessible areas underneath the vehicles.

It is within the scope of this invention to use through-whole LEDs, surface-mount LEDs or chip-on-board LEDs. The LEDs are preferably embedded within a relatively flexible polymer mass (i.e., a 70 shore A Scale) for ease of handling.

Referring to FIG. 4b, a cross section of an LED linear assembly 43, as placed in the polymer mass 41 is shown. The polymer mass includes a bottom edge 44, two side edges 45 and 46 and a top surfaces 47. The flexible polymer mass 41 serves two purposes; it makes the linear LED assemblies water-proof and impervious to foreign particles, and it embeds the LEDs reducing the chance of damage if overdriven by a vehicle. The transparent, abrasion resistant polymer mass 41, for instance, which is an aliphatic polyurethane protects the LED assembly against abrasion and other road calamities. The LED assembly 41 has a height of 2.5 cm and a width of 2.5 cm. The cross section of the LED assembly 43 is typically square in shape, although different cross-sectional shapes of assembly may be used.

The embodiments of the present invention can be temporarily or permanently installed at border crossings, military and law enforcement checkpoints, entrances to parking and building structures and other inspection points where a quick, but thorough inspection, for explosives and/or contraband is essential.

While the present invention has been described in connection with what is presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

BACKGROUND

U.S. Pat. No. 6,997,594 discloses a mobile under-vehicle inspection system to be used in the field. The inspection system includes a series of mats into which two lengths of flexible, polymeric side light transmitting optical fiber are included. The two optical fibers extend along channels placed near the edges of the mats, and at a distance to be within the tracks of wheels of a vehicle to be inspected. The optical fibers include notches and a reflector directed to provide a steady, uniform flood of light up to the underside of a vehicle to be inspected. A light source remotely located from the series of mats provides the necessary light.

Although the above system has proved valuable in the field of action; nonetheless, a more permanent form is desired that lasts longer, provides more light and is more conspicuous when turned off.

INVENTION

According to the present invention, there is disclosed embodiments that offer advantages over the above systems.

In one embodiment, the elongated polymeric side light transmitting optical fiber is embedded into a polymeric mass to extend the life of the optical fiber. Further, the polymeric mass is configured in such a shape to easily fit into a predetermined channel formed in location (i.e., a concrete channel or asphalt channel). The advantage offered is that the optical fiber does not protrude from the channel. Another advantage is that the installation is more permanent.

The invention claimed is:

1. An elongated, under vehicle inspection lighting system comprising:
   at least two linear sections of LED assemblies connected by conducting wire, arrayed in a substantially planar and linear configuration and embedded in a polymer mass;
   the polymer mass with a substantially geometric cross sectional configuration;
   placed in a channel with an opening substantially similar to the geometric cross sectional configuration of the polymer mass;
   said cross sectional configuration polymer mass, including the at least two linear sections of LED assemblies, flush mounted in the channel to project transmitted light at a predetermined angle outwardly unto the underside of a vehicle.

2. The elongated, under vehicle inspection lighting system of claim 1 comprising:
   more than two linear sections of LED assemblies.

3. The conducting wires connecting linear sections of LED assemblies of the elongated, under vehicle inspection lighting system of claim 1 providing;
   physical flexibility during shipping and installation.

* * * * *